Feb. 27, 1962 J. F. BARTON, JR., ETAL 3,022,883
WASTE RECEPTACLE ASSEMBLY
Filed Aug. 26, 1960 2 Sheets-Sheet 1

INVENTORS
James F. Barton Jr.,
BY & Ernest W. Bickel Jr.

E. W. Christen
ATTORNEY

Feb. 27, 1962   J. F. BARTON, JR., ETAL   3,022,883
WASTE RECEPTACLE ASSEMBLY
Filed Aug. 26, 1960   2 Sheets-Sheet 2
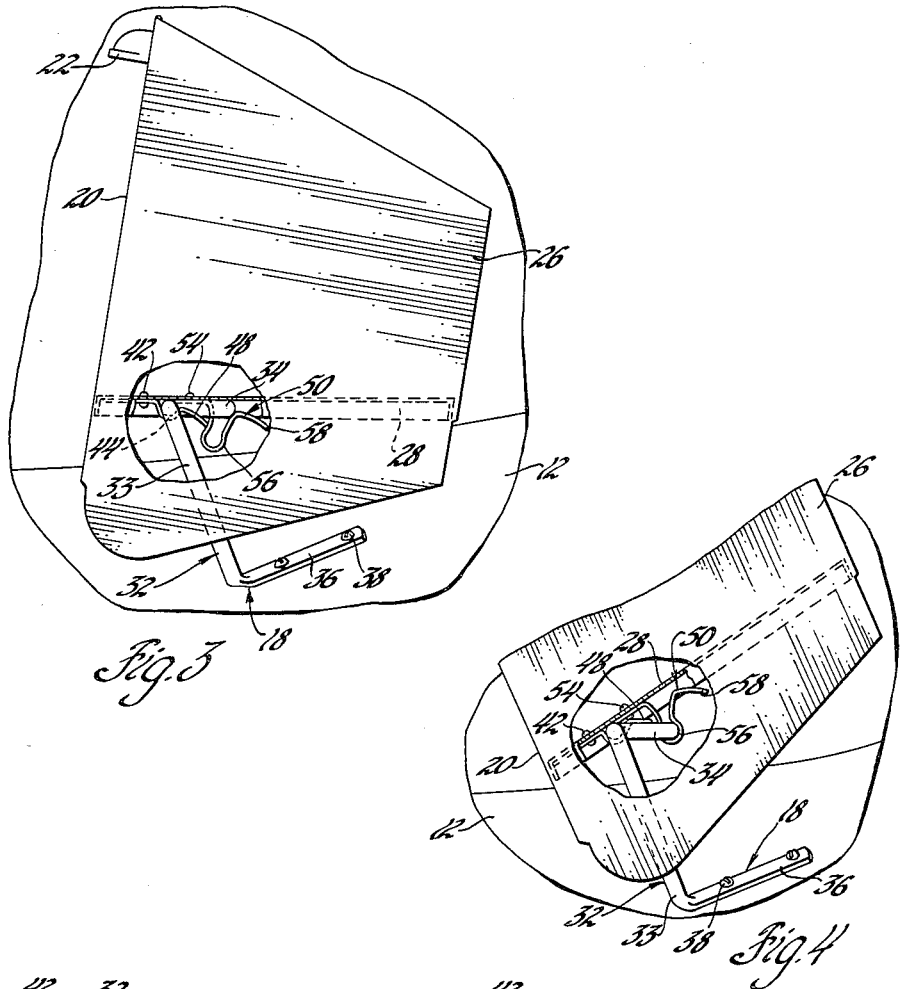
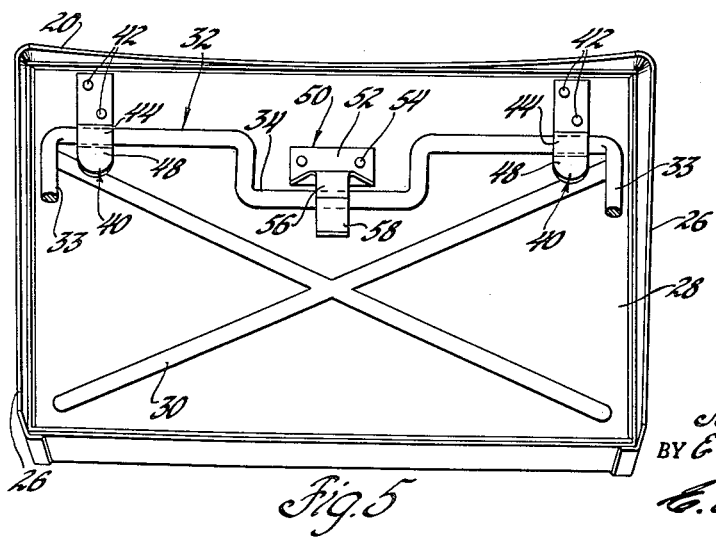
INVENTORS
James F. Barton Jr.
BY & Ernest W. Bickel Jr.
C. W. Christen
ATTORNEY

3,022,883
WASTE RECEPTACLE ASSEMBLY

James F. Barton, Jr., and Ernest W. Bickel, Jr., Livonia, Mich., assignors to General Motors Corporation, Detroit, Mich., a corporation of Delaware
Filed Aug. 26, 1960, Ser. No. 52,144
3 Claims. (Cl. 206—19.5)

This invention relates to waste receptacle assemblies, and more particularly to a waste receptacle for use in an automobile.

In the design and manufacture of automobiles it is becoming increasingly popular to place a litter or waste receptacle inside the vehicle to contain trash and the like, rather than have such trash thrown on the highways. Numerous designs and assemblies are available for such use, most of which are mountable in relatively non-accessible places or are exceedingly difficult to open and close or to use. Further, many of these devices require much manipulation in order to remove them from the automobile for emptying when full.

The device is which this invention is embodied comprises, generally, a container which is mountable beneath the dash panel of the vehicle and substantially centrally thereof. The container is mounted on a U-shaped bracket rod and has a plurality of spring members to both secure the container to the rod and to permit pivotal movement, making the container accessible for use. A spring member is so located as to limit the pivotal movement of the container without unnecessarily securing the retainer to the bracket rod and permit easy removal.

These and other advantages will become more apparent from the following description and drawings, in which:

FIGURE 3 is a side view of the waste receptacle assembly illustrated in FIGURE 2 and shown in the closed position;

FIGURE 4 is a side view of the waste receptacle assembly illustrated in FIGURE 2 and shown in the open position; and FIGURE 5 is a bottom view of the waste receptacle assembly illustrated in FIGURE 2.

Figure 1:
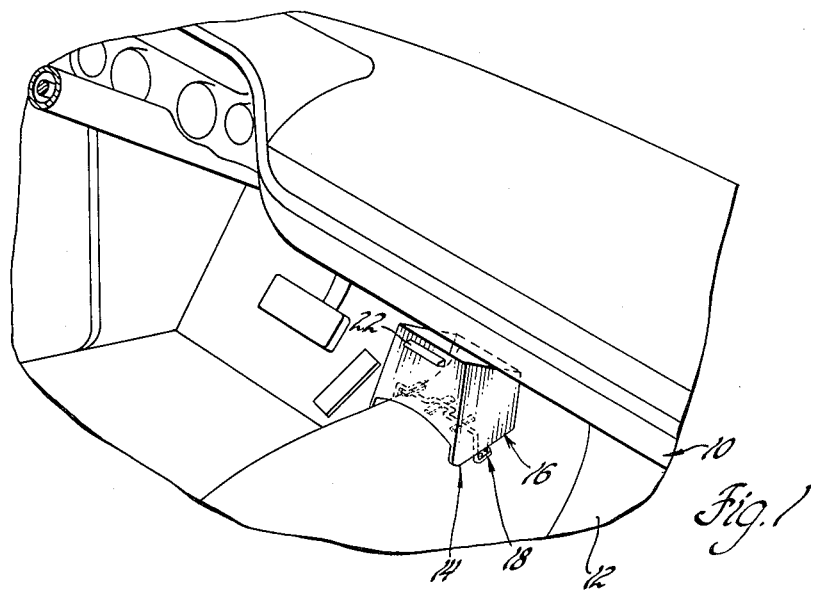
FIGURE 1 is a view of the interior of an automobile showing the dash panel and floor and the waste receptacle assembly mounted therein.
Figure 2:
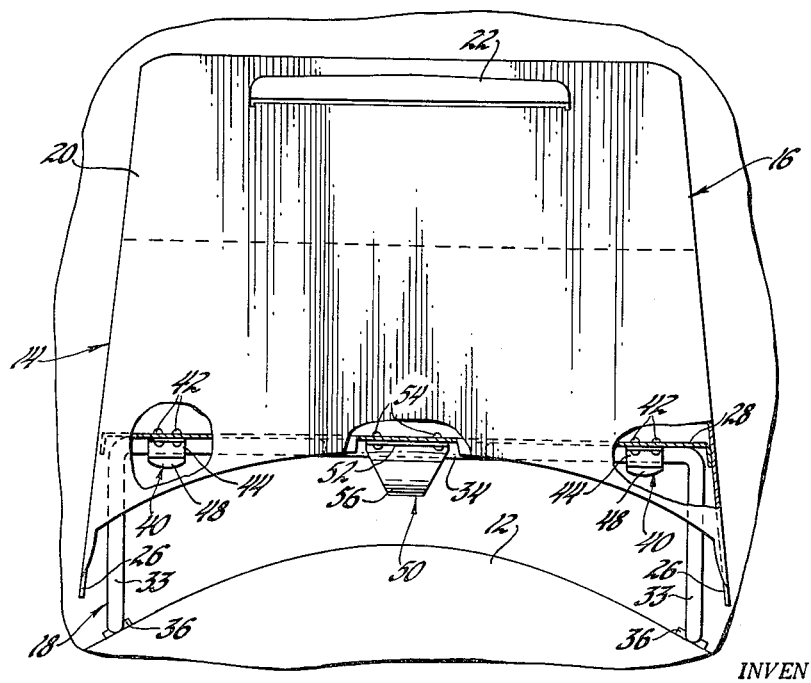
FIGURE 2 is an elevational view of the waste receptacle assembly illustrated in FIGURE 1.

Referring more particularly to the drawings, FIGURE 1 best illustrates the location and use of the waste receptacle assembly. A portion of a motor vehicle is shown in which a dash panel, indicated generally by the numeral 10, is mounted over a floor 12. The waste receptacle assembly, illustrated generally by the numeral 14, may be mounted centrally of the dash panel and conveniently placed over the hump in the floor caused by the vehicle transmission. In this position the waste receptacle is readily accessible to all of the vehicle passengers.

FIGURES 2-5 best illustrate the waste receptacle assembly 14. The assembly is shown to include a container, illustrated generally by the numeral 16, and a mounting bracket, illustrated generally by the numeral 18. The container 16 has a front panel 20 with a suitable handle 22 secured thereto in any suitable fashion, as by machine screws or the like. A pair of side panels 26 are secured to the front panel 20 in any suitable manner, as by spot welding, machine screws or bolts. A panel 28 is secured to the front panel 20 and the two side panels 26 and has a bend therein to form a back panel opposite the front panel 20 as well as a bottom for the container. An alternate construction would be to have a separate bottom panel and a back panel which would be secured together in any suitable manner, as by welding or machine screws. Bottom panel 28 may have strengthening ribs 30 formed therein in any suitable fashion, such as in an X shape, as illustrated in FIGURE 4.

The bracket for mounting the container 16 in the vehicle includes a generally U-shaped rod 32 having an offset portion 34 formed substantially centrally therein. The offset portion 34 extends in a direction away from the front panel 20 of the container 16. The end of each leg 33 of the rod 32 is flattened and bent, as at 36, and may contain suitable apertures to receive machine screws or bolts 38 for securing the bracket to the vehicle floor. The bend between flattened portion 36 and leg 33 is sufficient to permit easy mounting and proper alignment of the assembly in the vehicle.

Secured to the bottom panel 28 of the container 16 are a pair of pivot leaf springs 40 which are retained on the bottom panel by means of rivets or the like 42. Springs 40 may be mounted adjacent opposite edges of the bottom panel 28 and have substantially semi-cylindrical detents 44 formed therein to receive the base 46 of the U-shaped rod 32. Springs 40 are provided with tails 48 which, at their nearest point to the bottom panel 28, are spaced therefrom a distance less than the diameter of rod 32. Springs 40 serve as pivot members for the container 16, permitting rotation of the container from closed to open positions about the rod 32.

A locking spring, illustrated generally by the numeral 50, is secured to the bottom panel 28 of the container 16 and is substantially centrally located between the pivot springs 40. Spring member 50 is also adjacent the offset portion 34 of rod 32, for purposes to be hereinafter described. Spring 50 has an enlarged flat portion 52 having suitable apertures therein to permit the spring to be secured to the container bottom 28 in some suitable manner, as by rivets 54. Spring 52 has an elongated detent 56 formed therein and which is adapted to engage the offset portion 34 of rod 32. A tail 58 adjoins detent 56 and at the junction of the tail 58 and detent 56 the spring is spaced from the bottom panel 28 a distance slightly less than the diameter of the rod 32. It may be seen, in viewing FIGURE 4, that as the container 16 is rotated to the open position, elongated detent 56 of spring 50 moves with container 16 such that the bottom of the elongated detent engages offset portion 34 of rod 32. This limits the outward movement of the container 16 with respect to the dash panel 10. The length of elongated detent 56 is such that the optimum amount of movement is provided.

When container 16 is in the closed position, the upper end of elongated detent 56 engages the offset portion 34 of rod 32 and imparts a force to container 16 in such a direction and of such magnitude as to maintain the container 16 in such position. This also prevents vibrations and rattles in the assembly which would be objectionable to the vehicle user.

When it is desirable to remove the container 16 for emptying, it may be seen that the container 16 is removable from the bracket rod 32 since the pivot springs 40 and central spring 50 are slightly displaced from the bottom panel 28. With the container in the position shown in FIGURE 3, the container may be pulled horizontally away from the bracket member 32, and the springs 40 and spring 50 will expand to disengage from the bracket rod 32. When the container 16 has been emptied and it is desired to replace the container on the bracket rod 32, tails 48 and 58 on springs 40 and 50, respectively, cause expansion of the springs 40 and 50 as the container is moved toward the rod 32. The container is pushed inwardly until the detents 44 properly engage the rod 32 for the required pivotal movement.

Thus, it may be seen that a relatively simple waste receptacle assembly is provided which is positive in its opening and closing action and which is easily removed for emptying. Replacement of the container on the supporting rod is relatively simple, the container needing only to be snapped into place in the pivot springs.

What is claimed is:

1. A waste receptacle assembly comprising a container, a generally U-shaped mounting rod adapted to be secured to a supporting body, leaf spring members secured at one end thereof to the base of said container and an adjacent opposite sides thereof, each of said spring members having a detent formed centrally thereof and removably receiving said rod, the end opposite said end secured to said container being spaced from said container a distance less than the diameter of said rod, and a leaf spring lock member secured at one end to the base of said container and between said spring members, said lock member having an elongated detent formed centrally therein and a tail extending outwardly from said detent, the junction between said detent and said tail being spaced from said container a distance less than the diameter of said rod, said container being pivotable about said rod and on said spring members such that said elongated detent is moved into engagement with said rod to limit the pivotal movement of said container about said rod.

2. A waste receptacle assembly comprising a container, a generally U-shaped mounting rod adapted to be secured to a supporting body, said rod having an offset portion formed centrally of the base of said U-shape, leaf spring pivot members mounted at one end on the base of said container and adjacent opposite sides thereof, each of said pivot members having a detent formed therein and removably receiving said rod, a lock spring secured at one end to the base of said container and spaced between said pivot members, said lock spring having an elongated detent formed therein and engaging said offset portion of said rod, said container being rotatable about said rod and by said pivot members such that said elongated detent engages said rod and is moved thereover to limit the rotational movement of said container with respect to said rod.

3. The waste receptacle assembly set forth in claim 2, wherein said pivot members are spaced from said container at the unsecured ends thereof a distance less than the diameter of said rod, and said lock spring on the opposite side of said detent from said secured end is spaced from said container a distance less than the diameter of said rod to permit said container to be snapped into and out of engagement with said rod.

References Cited in the file of this patent

UNITED STATES PATENTS

| | | |
|---|---|---|
| 2,215,626 | Visser | Sept. 24, 1940 |
| 2,754,991 | Hagerty et al. | July 17, 1956 |
| 2,914,164 | Gingerich et al. | Nov. 24, 1959 |
| 2,933,225 | Fry et al. | Apr. 19, 1960 |

FOREIGN PATENTS

| | | |
|---|---|---|
| 571,939 | Great Britain | Sept. 14, 1945 |